US011536216B2

(12) United States Patent
Hart et al.

(10) Patent No.: US 11,536,216 B2
(45) Date of Patent: Dec. 27, 2022

(54) SYSTEMS AND METHODS FOR AN ENGINE

(71) Applicant: Transportation IP Holdings, LLC, Norwalk, CT (US)

(72) Inventors: Matthew Hart, Erie, PA (US); Thomas Lavertu, Ballston Lake, NY (US); Adam Felton, Erie, PA (US); Preeti Vaidya, Bangalore (IN); Daniel Loringer, Erie, PA (US); Venu Gupta, Erie, PA (US); Jesse Brigden, Westfield, NY (US); Justin Brumberg, Slippery Rock, PA (US); Taylor Gray, Cranberry Township, PA (US); Shawn Gallagher, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 17/446,823

(22) Filed: Sep. 2, 2021

(65) Prior Publication Data
US 2022/0112856 A1 Apr. 14, 2022

Related U.S. Application Data

(60) Provisional application No. 63/091,212, filed on Oct. 13, 2020.

(51) Int. Cl.
*F02D 41/40* (2006.01)
*F02D 41/38* (2006.01)
(Continued)

(52) U.S. Cl.
CPC ........... *F02D 41/401* (2013.01); *F02D 23/02* (2013.01); *F02D 31/007* (2013.01);
(Continued)

(58) Field of Classification Search
CPC ...... F02D 41/401; F02D 23/02; F02D 31/007; F02D 41/3836; F02D 2200/60; F02D 2200/703; B61C 5/00
See application file for complete search history.

(56) References Cited

U.S. PATENT DOCUMENTS

2012/0143477 A1* 6/2012 Ruona ................... F02D 35/024
701/103
2017/0292463 A1* 10/2017 Ochi ....................... F02D 37/02

FOREIGN PATENT DOCUMENTS

CN 1469064 A 1/2004
RU 85576 U1 8/2009
(Continued)

OTHER PUBLICATIONS

Zimmermann, K. et al., "Engine Performances With Advanced Common Rail Injector Design," Proceedings of the ASME 2017 Internal Combustion Engine Division Fall Technical Conference (ICEF 2017), Oct. 15, 2017, Seattle, Washington, 8 pages.
(Continued)

*Primary Examiner* — Joseph J Dallo
(74) *Attorney, Agent, or Firm* — McCoy Russell LLP

(57) ABSTRACT

Various systems and methods are provided for adjusting operating parameters of an internal combustion engine. In one example, a system may include adjusting an amount of advance of a fuel injection timing of a plurality of fuel injectors of an internal combustion engine relative to top dead center (TDC) responsive to engine output demand, where, as the engine output demand increases, the amount of advance first decreases and then increases. In this way, an amount of vehicle emissions may be decreased while an amount of fuel consumption is decreased.

20 Claims, 11 Drawing Sheets

(51) Int. Cl.
    *F02D 31/00*         (2006.01)
    *F02D 23/02*         (2006.01)
    *B61C 5/00*          (2006.01)

(52) U.S. Cl.
    CPC ............ *F02D 41/3836* (2013.01); *B61C 5/00* (2013.01); *F02D 2200/60* (2013.01); *F02D 2200/703* (2013.01)

(56) References Cited

FOREIGN PATENT DOCUMENTS

| | | | | |
|---|---|---|---|---|
| RU | 2669121 C2 | 10/2018 | | |
| WO | WO-2009063298 A1 | * 5/2009 | ......... | F02D 19/0605 |
| WO | WO-2014199425 A1 | * 12/2014 | ............ | F02D 23/02 |
| WO | 2017199963 A1 | 11/2017 | | |

OTHER PUBLICATIONS

Eurasian Patent Office, Search Report Issued in Application No. 202192384, dated Apr. 7, 2022, 4 pages.

\* cited by examiner

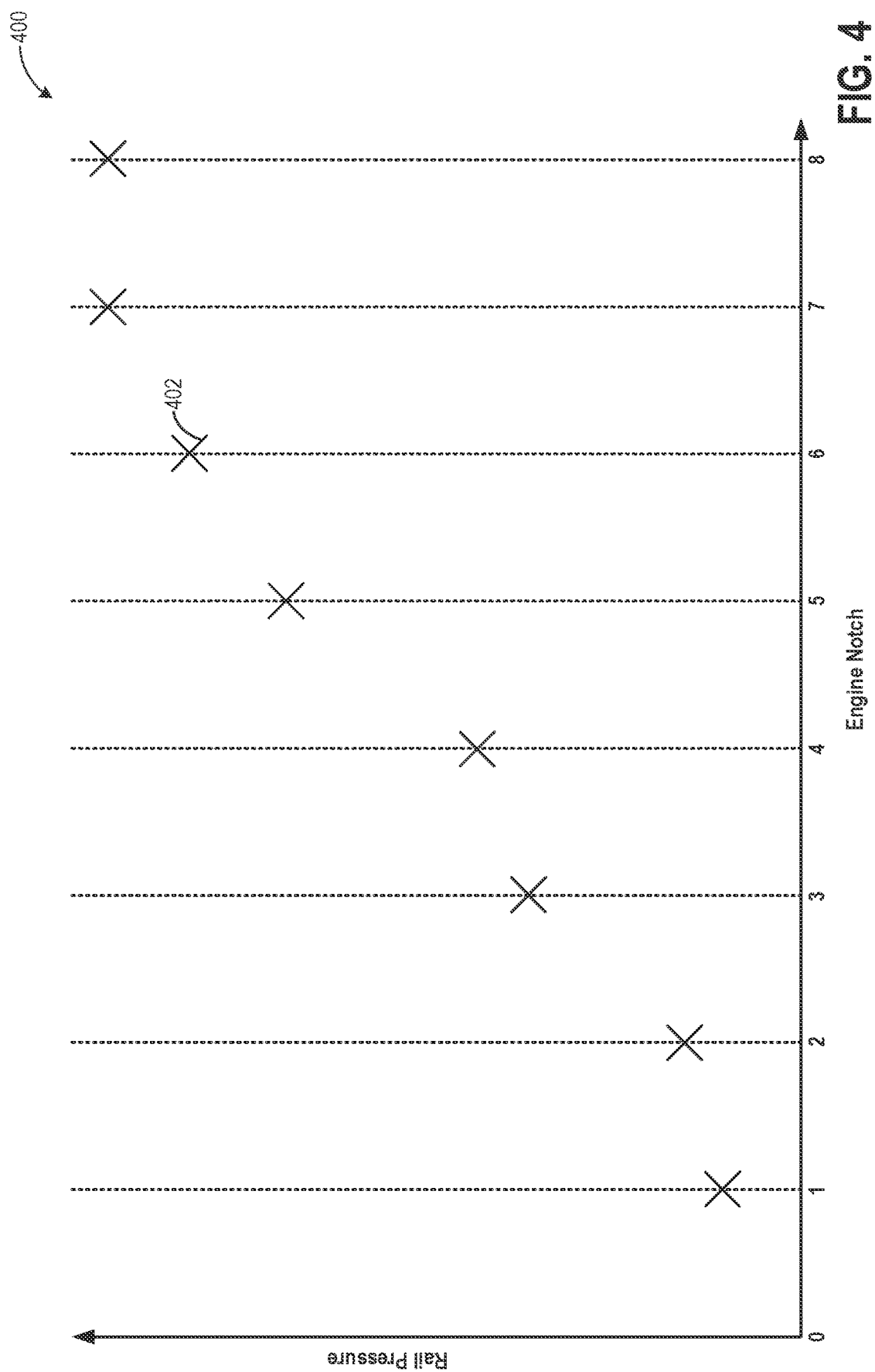

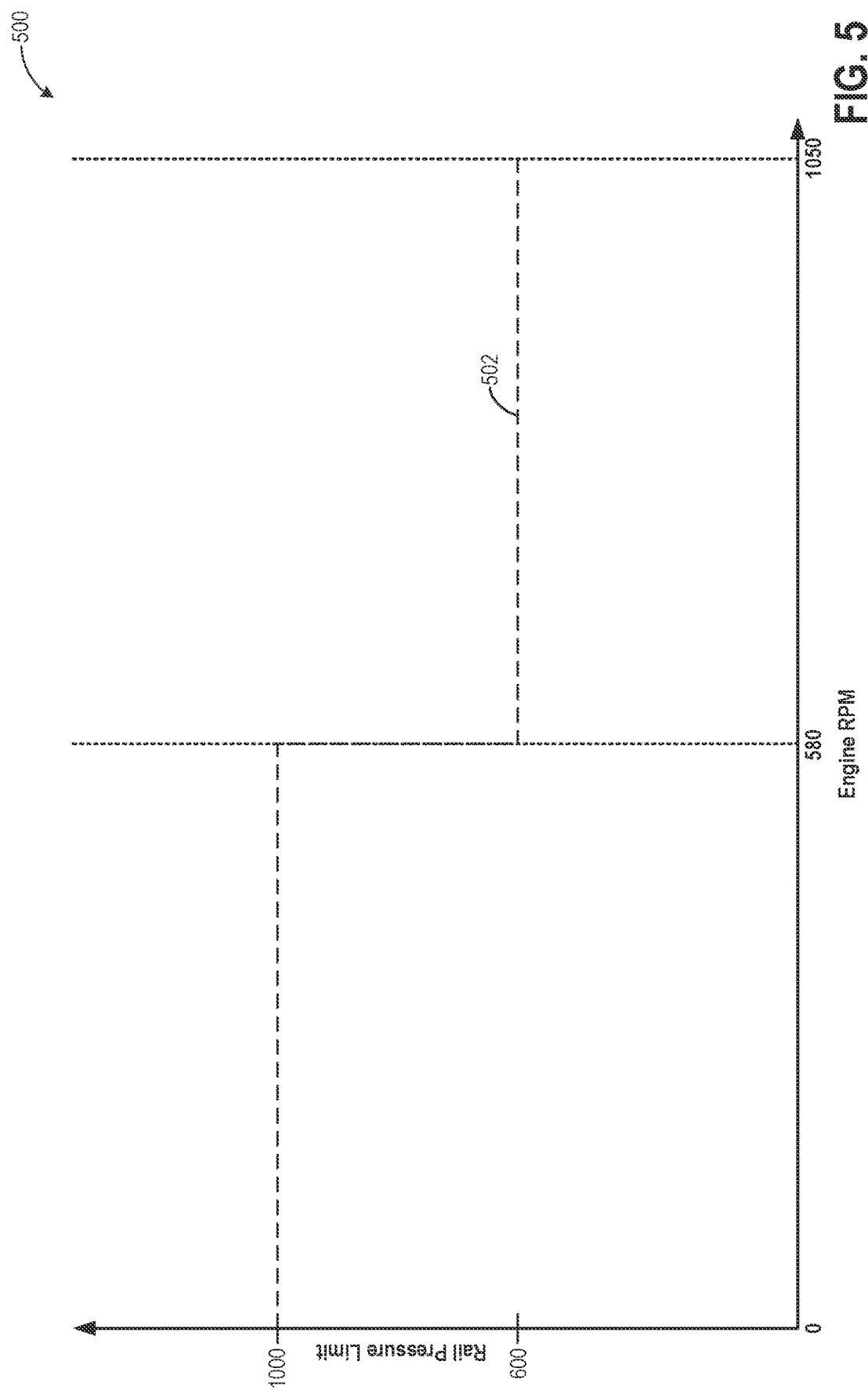

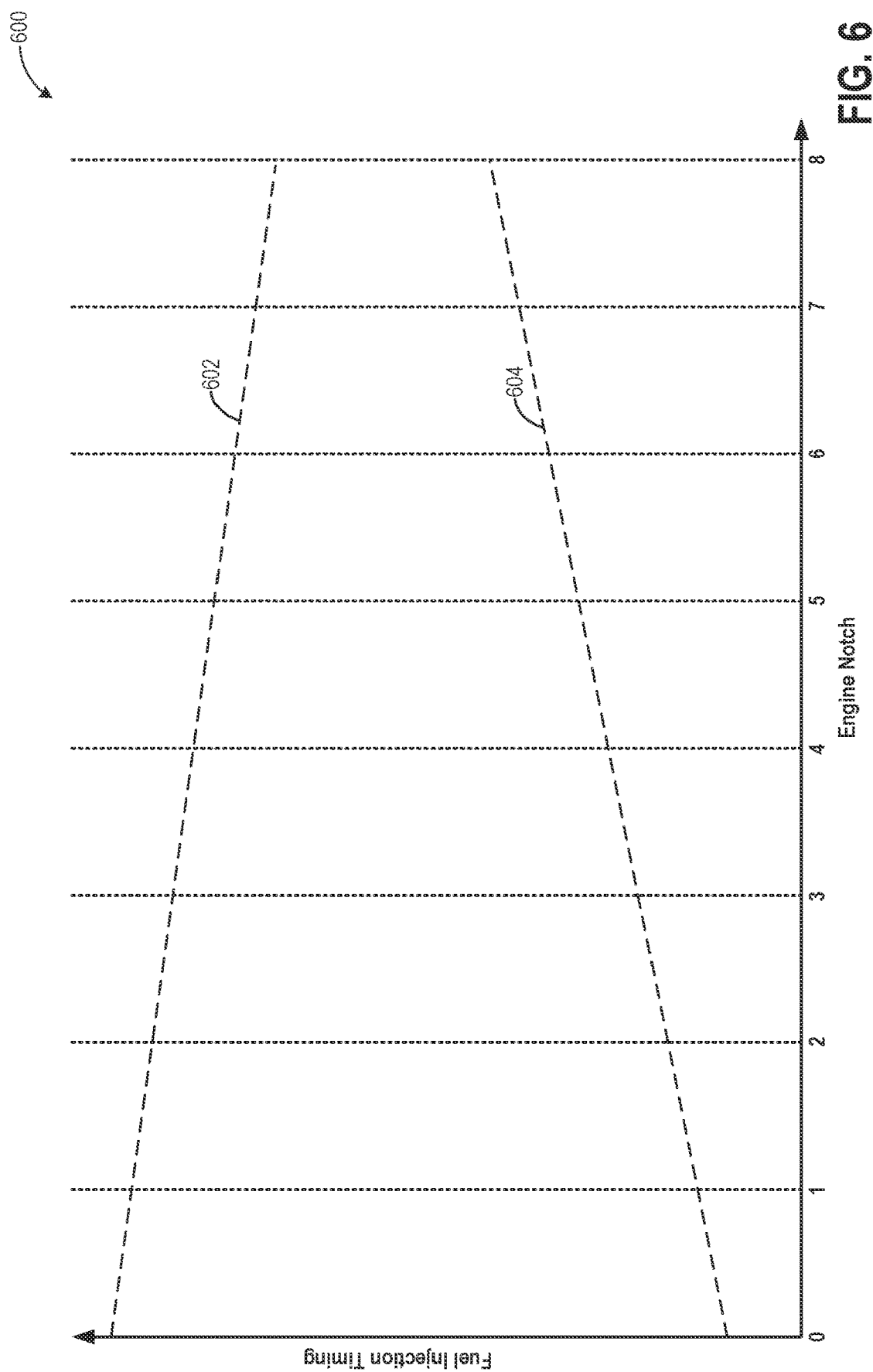

SYSTEMS AND METHODS FOR AN ENGINE

CROSS REFERENCE TO RELATED APPLICATIONS

This application claims priority to U.S. Provisional Application No. 63/091,212 entitled "SYSTEMS AND METHODS FOR A LOCOMOTIVE ENGINE", and filed on Oct. 13, 2020. The entire contents of the above-listed application are hereby incorporated by reference for all purposes.

TECHNICAL FIELD

Embodiments of the subject matter disclosed herein relate to internal combustion engines.

DISCUSSION OF ART

Vehicles using combustion power sources, such as internal combustion engines, may limit the amount of vehicle emissions (e.g., emissions of gases and particulate matter) and increase vehicle fuel efficiency. For some existing engines, operating the engine to limit emissions and increase fuel efficiency may cause the engine to operate outside engine hardware limits. For example, an engine may be limited by a cylinder pressure constraint. As another example, an engine may be limited by a map width of a compressor stage of a turbocharger of the engine. For example, based on the map width of the compressor stage of the turbocharger of the engine, the turbocharger may provide a limited amount of boost air during engine operation. Because limiting vehicle emissions and increasing fuel efficiency may require the engine to operate outside engine hardware limits, an incidence of component degradation may increase, and a lifetime of the engine may decrease. Further, low fuel efficiency may increase a total fuel cost for the engine, which may decrease customer satisfaction. As such, it may be desirable to have a system for limiting the emissions and increasing the fuel efficiency of an engine that differs from those that are currently available. The above issues are not admitted to be recognized in the state of the art.

BRIEF DESCRIPTION

In one embodiment, a system may include adjusting an amount of advance of a fuel injection timing of a plurality of fuel injectors of an internal combustion engine relative to top dead center (TDC) responsive to engine output demand, where, as the engine output demand increases, the amount of advance first decreases and then increases.

BRIEF DESCRIPTION OF THE DRAWINGS

FIG. 4 shows an example graph of a relationship between engine notches and rail pressure for a fuel injection system of an engine.

FIG. 5 shows an example graph of a relationship between engine RPM and rail pressure limits for an engine.

FIG. 6 shows an example graph of a relationship between engine notches and fuel injection timing limits for an engine.

DETAILED DESCRIPTION

Figure 1:
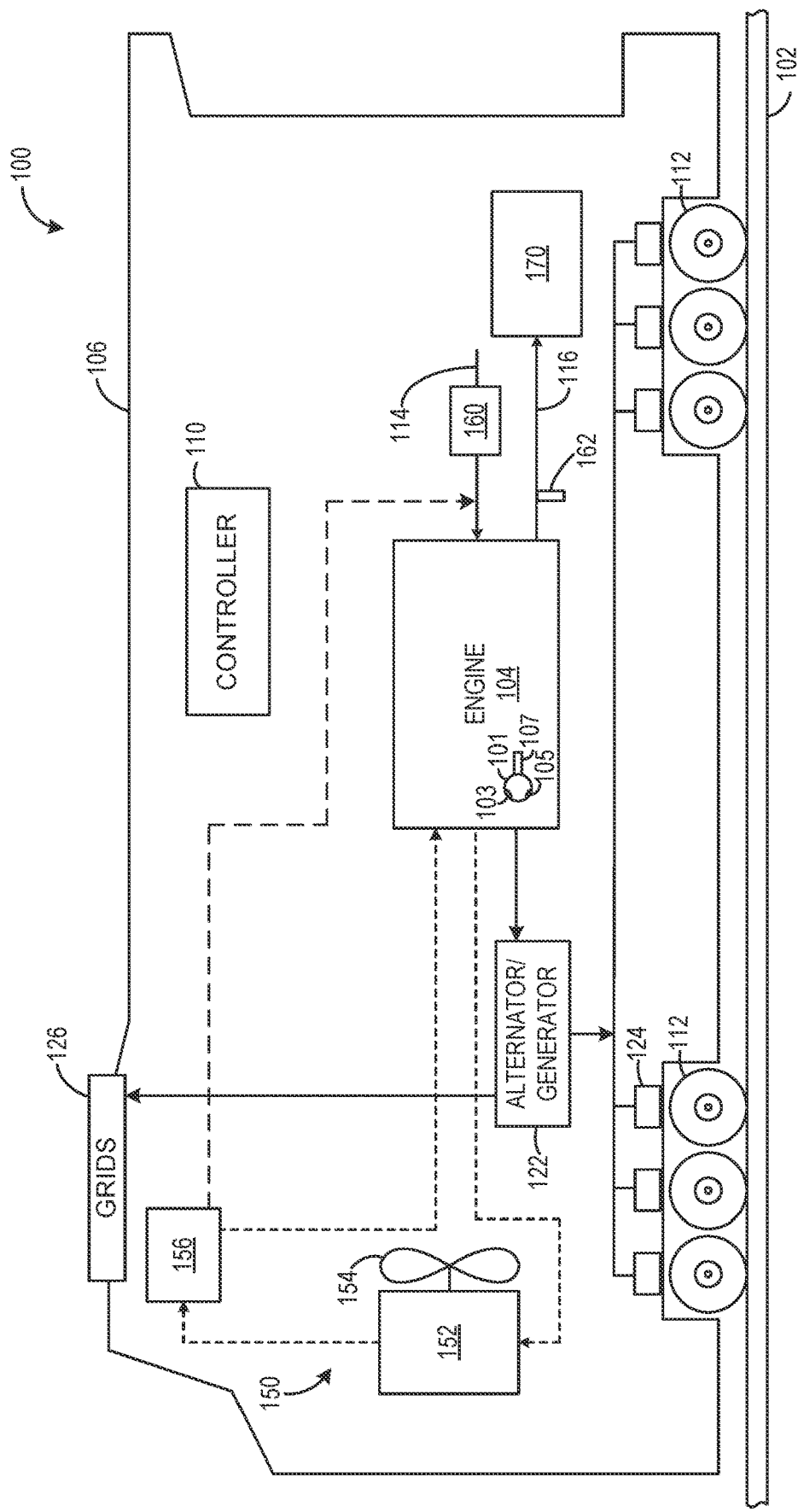
FIG. 1 shows a schematic diagram of a vehicle with an engine, according to an embodiment of the present disclosure.
Figure 8:
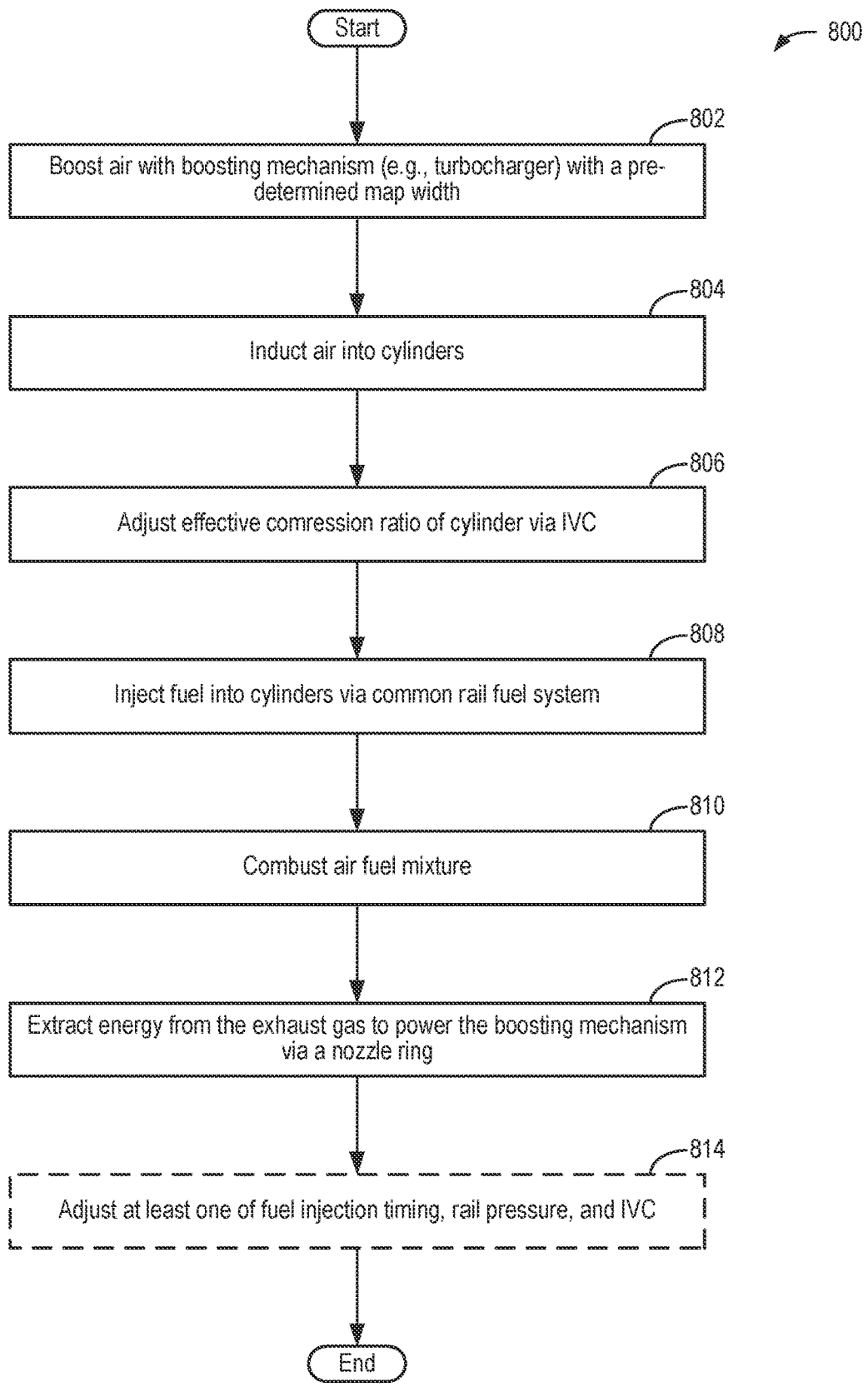
FIG. 8 shows an example method for adjusting engine settings based on an engine notch setting.
Figure 9:
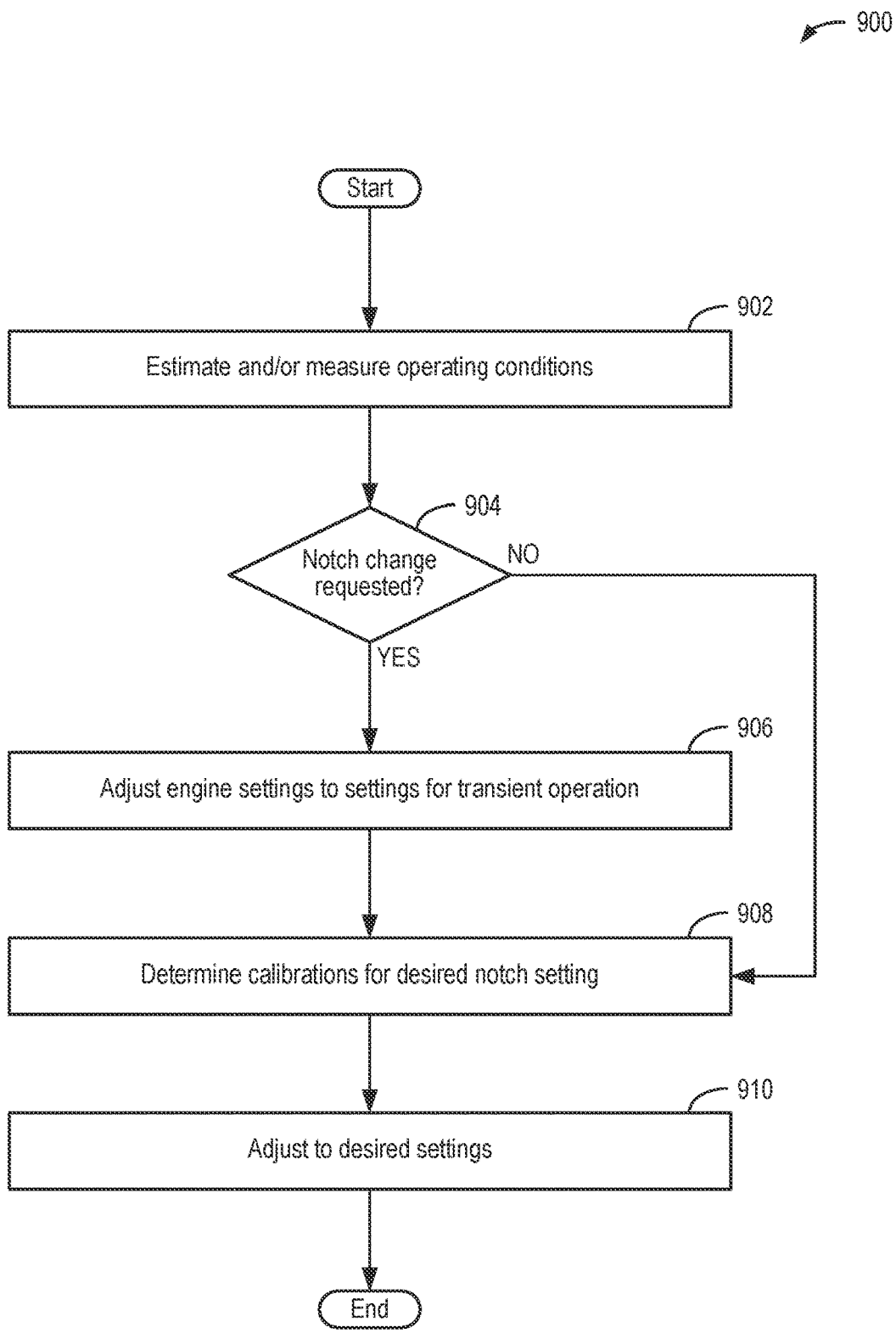
FIG. 9 shows an example method for operating an engine.
Figure 10:
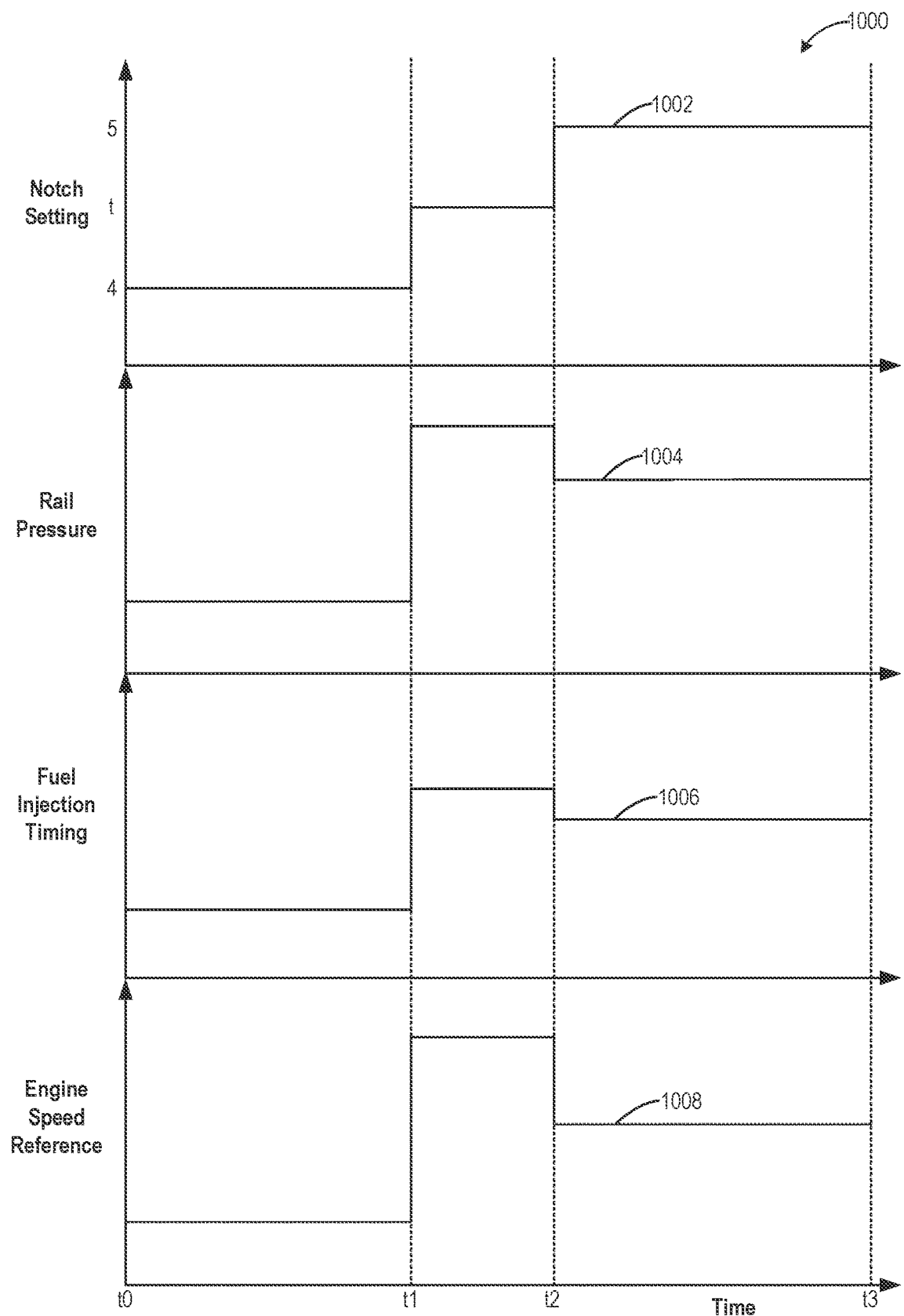
FIG. 10 shows an example timeline for adjusting a notch setting of an engine, including a transient setting.

The following description relates to embodiments of a system/method for vehicle having an internal combustion engine configured to limit vehicle emissions and increase fuel efficiency. In one example, a vehicle system (e.g., a rail vehicle system), such as shown in FIG. 1, may include an engine for combusting an air-fuel mixture, and may include a lubrication system for providing engine oil to various engine components. In order to increase engine efficiency and decrease fuel usage, the engine may include a common rail fuel system, a turbocharger with an increased compressor map width, and advanced intake valve closing (IVC) timing. FIGS. 2-7C show calibrations for operating the engine shown in FIG. 1 to increase engine efficiency. Further, FIG. 8 shows a method for operating the engine, while FIG. 9 shows a method for adjusting engine operation in response to a transient condition during an engine output demand transition. Further, FIG. 10 shows an example timeline for adjusting engine operating conditions during the transient condition.

The approach described herein may be employed in a variety of engine types, and a variety of engine-driven systems. For clarity of illustration, a rail vehicle such as a locomotive may be provided as an example of a mobile platform supporting a system incorporating an embodiment of the disclosure. For example, the mobile platform may be a shunter locomotive with an engine, as will be elaborated below.

FIG. 1 shows an embodiment of a vehicle system. Specifically, FIG. 1 shows a block diagram of an embodiment of a vehicle system 100, herein depicted as a locomotive vehicle 106 configured to run on a track 102 via a plurality of wheels 112. As depicted, the locomotive includes an engine 104. The engine includes a plurality of cylinders 101 (only one representative cylinder shown in FIG. 1) that each include at least one intake valve 103, at least one exhaust valve 105, and at least one fuel injector 107. Each fuel injector may include an actuator that may be actuated via a signal from a controller 110 of the engine. In some examples, the intake valves and exhaust valves may be controlled by a camshaft, with the camshaft configured to open and close the valves at pre-determined times. For example, rotation of the camshaft may be tied to engine speed, and the camshaft may include a plurality of cams with lobes, so that the cams open and close intake and exhaust valves at pre-determined engine positions. As an example, in order to reduce airflow to the cylinders and reduce temperature rise during the compression stroke, the intake valve closing time may be configured to be advanced relative to top dead center (TDC), such as by adjusting a position of the intake valve cams and/or adjusting a shape of the intake valve cams. In other examples, each intake valve and each exhaust valve may include an actuator that may be actuated via a signal from the controller. In other non-limiting embodiments, the engine may be a stationary engine, such as in a power-plant application, or an engine in a marine vessel or other off-highway vehicle propulsion system as noted above.

The engine receives intake air for combustion from an intake passage 114. The intake passage includes an air filter 160 that filters air from outside of the locomotive. Exhaust gas resulting from combustion in the engine is supplied to an exhaust passage 116. For example, the exhaust passage may include an exhaust gas sensor 162, which may monitor a temperature and/or combustion products of the exhaust gas. Exhaust gas flows through the exhaust passage and an exhaust system 170 of the locomotive. For example, the exhaust passage may be coupled to a spark arrestor in order to decrease sparks and/or carbon deposits in the exhaust and a muffler in order to reduce unwanted exhaust noise.

The vehicle system may further include an aftertreatment system coupled in the exhaust passage. In one embodiment, the aftertreatment system may include one or more emission control devices. Such emission control devices may include a selective catalytic reduction (SCR) catalyst, a three-way catalyst, a NOX trap, or various other devices or exhaust aftertreatment systems. In another embodiment, the aftertreatment system may additionally or alternatively include an oxidation catalyst, such as diesel oxidation catalyst (DOC) and a particulate filter (PF).

Further, combustion in the cylinder(s) drives rotation of a crankshaft (not shown). In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally or alternatively combust fuel including gasoline, hydrogen, ammonia, alcohol such as ethanol (EtOH) and/or methanol, kerosene, natural gas, biodiesel, or other petroleum distillates of similar density through compression ignition (and/or spark ignition). The fuel may be liquid, gaseous, and/or a combination thereof.

As depicted in FIG. 1, the engine is coupled to an electric power generation system that includes an alternator/generator 122. For example, the engine is a diesel and/or natural gas engine that generates a torque output that is transmitted to the alternator/generator, which is mechanically coupled to the crankshaft, as well as to at least one of the plurality of wheels 112 to provide motive power to propel the locomotive. The alternator/generator produces electrical power that may be stored (such as, in a battery) and/or applied for subsequent propagation to a variety of downstream electrical components. In one example, the alternator/generator may be coupled to an electrical system 126. The electrical system may include one or more electrical loads configured to run on electricity generated by the alternator/generator, such as vehicle headlights, a cabin ventilation system, and an entertainment system, and may further include an energy storage device (e.g., a battery) configured to be charged by electricity generated by the alternator/generator. In some examples, the vehicle may be a diesel electric vehicle, and the alternator/generator may provide electricity to one or more electric motors to drive the wheels 112.

As depicted in FIG. 1, the vehicle system further includes a cooling system 150 (e.g., an engine cooling system). The cooling system circulates coolant through the engine to absorb waste engine heat and distribute the heated coolant to a heat exchanger, such as a radiator 152 (e.g., a radiator heat exchanger). In one example, the coolant may be water, anti-freeze, or a mixture of the two. In another example, the coolant may be oil. A fan 154 may be coupled to the radiator in order to maintain an airflow through the radiator when the vehicle is moving slowly or stopped while the engine is running. In some examples, fan speed may be controlled by the controller. Coolant that is cooled by the radiator may enter a tank (not shown). The coolant may then be pumped by a pump 156 back to the engine or to another component of the vehicle system.

The controller may be configured to control various components related to the locomotive vehicle system. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of locomotive operation. In some examples, the controller may include more than one controller each in communication with one another, such as a first controller to control the engine and a second controller to control other operating parameters of the vehicle (such as engine load, engine speed, brake torque, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the engine and/or vehicle, may be configured to receive signals from a variety of engine sensors, as further elaborated herein, in order to determine operating parameters and operating conditions, and correspondingly adjust various engine actuators to control operation of the engine and/or vehicle. For example, the controller may receive signals from various engine sensors including, but not limited to, engine speed, engine load, intake manifold air pressure, boost pressure, exhaust pressure, ambient pressure, ambient temperature, exhaust temperature, particulate filter temperature, particulate filter inlet pressure or particulate filter pressure drop, engine coolant pressure, or the like. Additional sensors, such as coolant temperature sensors, may be positioned in the cooling system. Correspondingly, the controller may control the engine and/or the vehicle by sending commands to various components such as the one or more electric motors 124, the alternator/generator, fuel injectors, valves, coolant pump, or the like. For example, the controller may control the operation of a restrictive element (e.g., such as a valve) in the engine cooling system. Other actuators may be coupled to various locations in the vehicle.

Further, the controller may monitor an engine output demand for an engine governor. In an exemplary embodiment, the engine output demand may include a notch setting or a throttle setting. For example, the engine governor may react to the engine notch setting in order to adjust engine operation. For example, an operator of the vehicle may adjust an input device from a plurality of engine notch settings. Based on the selected engine notch setting, the controller may adjust engine operation to provide the desired engine performance (e.g., such as a desired vehicle speed). As an example, the plurality of engine notch settings may include a notch 0, a notch 1, a notch 2, a notch 3, a notch 4, a notch 5, a notch 6, a notch 7, and a notch 8. An increase in the numerical value of the notch may correspond with an increase in vehicle speed and/or with engine power output, as well as adjustments to fuel injection timing and rail pressure. For example, notch 0 may correspond to not moving the locomotive, notch 4 may provide a mid-level of speed, and notch 8 may be the maximum speed setting. For example, the controller may adjust engine revolutions per minute (RPM), gearing, valve timings, and other parameters in order to move the vehicle at a speed corresponding to the selected engine notch. For example, the engine may be adjusted to generate more power in order to increase the vehicle speed, or to accommodate a heavy load (e.g., due to cargo and/or grade).

Further, the vehicle may limit the amount of emissions and increase fuel efficiency. For example, existing diesel locomotive engines may include a unit-pump injector, which may tie the injection pressure to the engine speed and cam-timing. Further, such an engine system may include a volumetric efficiency optimized intake and exhaust cam profiles, which may focus on allowing as much air to be captured in the cylinder for the compression stroke as possible. Further, a turbocharger included in existing diesel locomotive engines may have a limited map width. Operating such a system (e.g., a diesel locomotive engine including a unit-pump injector, volumetric efficiency, and limited map width) to limit the amount of emissions and increase fuel efficiency may lead to operating outside mechanical limits of engine components and may also lead to a relatively low efficiency when operating within the mechanical limits. For example, operating an engine outside hardware limits of engine components may increase an incidence of component degradation, and increase maintenance costs.

In order to limit emissions and increase fuel efficiency, without exceeding mechanical limits of the engine, the inventors herein have realized several features, which may combine synergistically to reduce vehicle emissions and increase vehicle efficiency. First, rather than a unit-pump injector, the engine may include a common rail fuel system, that is, a high pressure fuel pump with common rail fuel lines and appropriately sized rail volume feeding to electronically controlled injectors. Including the common rail fuel system may improve spray atomization of fuel during injection, and may reduce particulate matter (PM) formation. Further, including a common rail fuel system decouples injection pressure and timing from engine speed and/or camshaft timing, which allows optimization of a tradeoff between (products of combustion) nitrogen oxide (NOx), particulate matter (PM), and specific fuel consumption (SFC), while remaining within mechanical limits of the engine. Second, the intake valve timing may be advanced relative to bottom dead center (BDC) (i.e., early Miller Cycle), in order to reduce airflow to the cylinder while reducing temperature rise during the compression stroke. For example, the intake valve closing (IVC) may be earlier. Adjusting intake valve timing, as described, may reduce NOx formation during combustion. In particular, the intake valve timing may be advanced relative to or BDC (e.g., moved with respect to BDC to reduce the effective compression ratio). Third, the turbocharger may include an optimized compressor wheel, a diffuser, and a nozzle ring for increasing turbocharger efficiency. Taken together, these adjustments to the turbocharger may increase compressor map width. For example, increasing the turbocharger compressor map width increases a surge margin of the turbocharger. Further, PM formation may be reduced, while the mechanical limits of the turbocharger may be increased, in order to increase a range of engine operation.

The three features elaborated above (e.g., the inclusion of a common rail fuel system, advanced intake valve timing, and a turbocharger with increased map width) may be advantageously combined in order to reduce vehicle emissions while increasing vehicle fuel efficiency. Further, combining the three features may provide additional benefits above the benefits provided by each feature alone. As an example, NOx reduction may be primarily achieved via control of volumetric efficiency of airflow and a reduction in an effective compression ratio of cylinders of the engine via advanced intake valve timing. However, such a change in air flow may increase an amount of boost required from the turbocharger. For example, without including a turbocharger with an increased map width as described above, advancing the intake valve timing may result in component degradation, and may degrade engine operation overall. To reduce an incidence of such component degradation, the turbocharger is advantageously operated (e.g., via a turbocharger with increased map width) to synergistically decrease vehicle emissions. Further, the reduction in volumetric efficiency (e.g., resulting from the advanced intake valve timing) may reduce airflow for a given boost level at all engine notches. For example, reduced airflow at mid notches may reduce combustion quality in systems with a unit-pump injector system. As such, benefits to engine efficiency and emissions may be outweighed by a decrease in engine performance without including a common rail fuel system. Thus, including the common rail fuel system may synergistically address issues with combustion quality, so that the benefits of reduced volumetric efficiency from advanced IVC (e.g., reduced vehicle emissions) may be retained without a decrease in combustion efficiency or reduced combustion quality leading to an increase in particular matter emissions. For example, each of the fuel injection pressure and the fuel injection timing may be calibrated for each engine notch in order to advantageously reduce vehicle emissions and increase vehicle efficiency. Overall, the three adjustments to the diesel engine system elaborated above may interact synergistically, such that the combination of the three adjustments provides a greater benefit than each of the three adjustments may provide individually, so that engine efficiency is increased, emissions are decreased, fuel consumption is decreased, and engine performance is maintained.

In order to provide these benefits at any engine output demand various engine operating conditions may be calibrated at each engine output demand in order to maintain low vehicle emissions and high fuel efficiency. In an exemplary embodiment, engine operating conditions may be calibrated at each notch setting. In particular, FIGS. 2-7B show engine calibrations across the range of engine operating conditions in a system including a common rail fuel system, advanced IVC, and an increased map width for the turbocharger.

Figure 2:
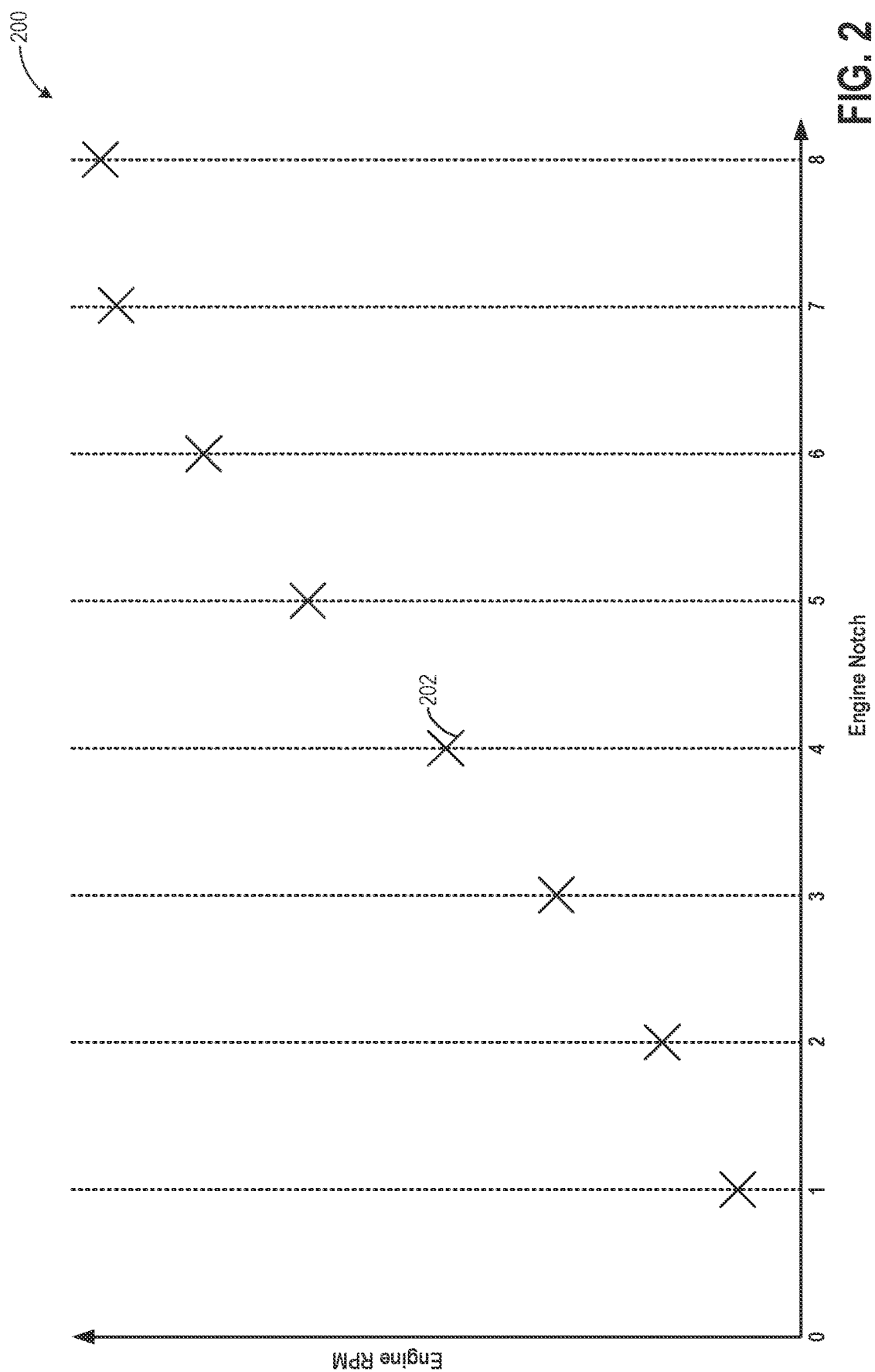
FIG. 2 shows an example graph of a relationship between engine notches and engine revolutions per minute (RPM) for an engine.

Turning now to FIG. 2, a graph 200 shows an example relationship between engine notches and engine RPM. For example, the example relationship of graph 200 may correspond to a notch schedule for engine RPM based on a selected engine notch. A target engine RPM for each engine notch is shown by cross marks 202. For the above, the vertical axis shows a relative engine RPM, with the target engine RPM increasing up the vertical axis from bottom to top. The horizontal axis shows the engine notches, with the engine notches increasing along the horizontal axis from left to right. As shown, the target engine RPM (cross marks 202) may increase with engine notches, such that the target engine RPM continuously increases in proportion to the engine notch setting. Stated differently, the relationship between target engine RPM and engine notch setting may be described by a monotonic function. For example, the calibration includes higher target RPM for higher notches in order to increase an amount of airflow through the engine and avoid turbocharger operation outside of surge margin limits, increase bearing oil film thickness, and increase in-cylinder peak firing pressures. Further, higher target RPMs at higher notches may increase ventilation in the engine, as the electrical frequency for an auxiliary alternator may be tied to engine RPM. An increased airflow may also allow for more fuel to be injected and higher torque/power. Increasing engine ventilation may reduce engine temperature at higher notches, which may decrease an incidence of component degradation.

Figure 3:
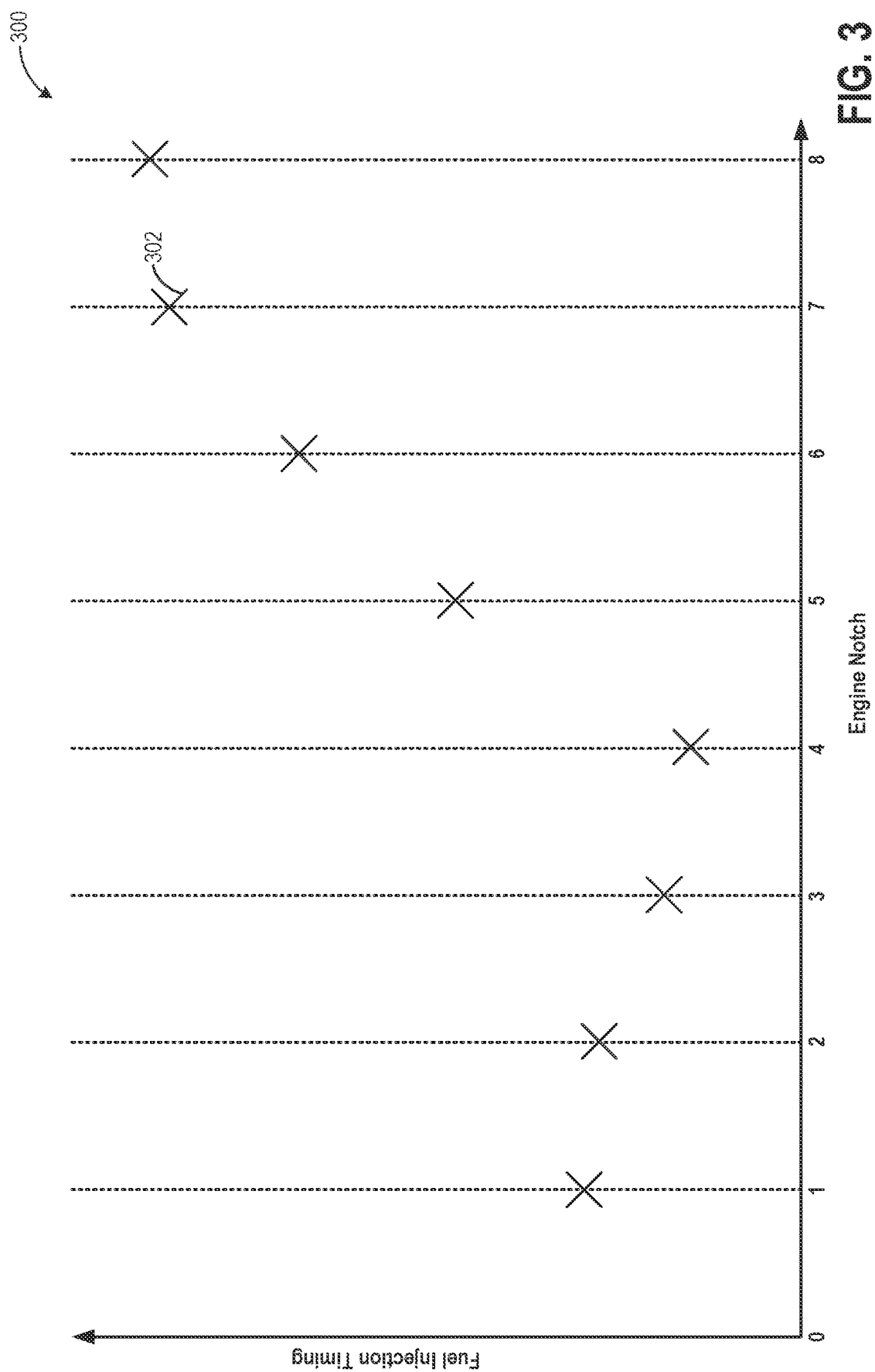
FIG. 3 shows an example graph of a relationship between engine notches and fuel injection timing for an engine.

Next, in FIG. 3, a graph 300 shows an example relationship between engine notches and fuel injection timing. For example, graph 300 shows a calibration for fuel injection timing at each engine notch in order to reduce vehicle emissions while increasing fuel efficiency. A target fuel injection timing for each engine notch is shown by cross marks 302. For the above, the vertical axis shows a relative fuel injection timing, with the target fuel injection timing increasing up the vertical axis from bottom to top. The horizontal axis shows the engine notches, with engine notches increasing along the horizontal axis from left to right. As shown, low notches (e.g., notch 2 and below) may include less advanced target fuel injection timings because fuel consumption may vary widely in this region, which may impact emission and fuel consumption minimally. At notch 3 and notch 4, the target fuel injection timing may be even less advanced, the less advanced timing reducing peak combustion temperatures which lead to lower NOx emissions. Further, as power increases (e.g., notch 5 and above), fuel consumption may be reduced via advanced timings in order to maximize a reduction in fuel consumption. For example, the amount of advance continuously decreases between notch 1 and notch 4, and the amount of advance continuously increases between notch 4 and notch 8. For example, the relationship between the amount of advance and the engine notch setting is non-monotonic. Further, in some examples, higher RPM and low power operating conditions may include more advanced target fuel injection timing in order to reduce hydrocarbon emissions while maintaining combustion stability.

Next, in FIG. 4, a graph 400 shows an example relationship between engine notches and rail pressure (e.g., rail pressure for fuel injection). A target rail pressure for each engine notch is shown by cross marks 402. For the above, the vertical axis shows a relative rail pressure, with target rail pressure increasing up the vertical axis from bottom to top. The horizontal axis shows the engine notches increasing along the horizontal axis from left to right. As shown, low notches (e.g., less than notch 3) may include lower target rail pressure due to variations in fuel consumption in this region. For example, lower notches may correspond to low power operation. Further, target rail pressure increases for notch 3 and notch 4 in order to limit/decrease PM. For example, at notch 3 and notch 4, boost may be applied to/realized by engine operation, while a relatively low air-fuel ratio (AFR) is requested. Overall, rail pressure may continuously increase (e.g., increasing monotonically) in response to the engine notch setting increasing. In order to provide the low AFR, mid-range rail pressure may be requested, and the higher injection pressure may control PM and may benefit thermodynamic efficiency.

Next, in FIG. 5, a graph 500 shows an example relationship between engine RPM and a rail pressure limit. For example, although a target rail pressure calibration was given in FIG. 4 based on a selected engine notch, other engine operating conditions such as engine RPM may cause the controller to adjust rail pressure in order to maintain engine operation. A rail pressure limit is shown by dashed plot 502. For the above, a vertical axis shows the rail pressure limit, with the rail pressure limit increasing up the vertical axis from bottom to top. The horizontal axis shows the engine RPM increasing along the horizontal axis from left to right. As shown, up to 580 RPM, rail pressure is constrained to 1000 bar due to mechanical limitations of the high pressure fuel pump. For example, up to 580 RPM, the rail pressure may not exceed 1000 bar. Further, above 580 RPM, the system is constrained to 1600 bar due to mechanical limitations of the high pressure fuel pump and fuel injector. For example, above 580 RPM, the rail pressure may go up to 1600 bar.

Next, in FIG. 6, a graph 600 shows an example relationship between engine notches and fuel injection timing limits. For example, although target fuel injection timings are shown in FIG. 3, fuel injection timing may be adjusted from the target fuel injection timings based on various engine operating conditions, such as engine temperature and engine power. The relationship shown in graph 600 demonstrates maximum and minimum limitations on fuel injection timing across the engine notches. An upper fuel injection timing limit is shown by dashed plot 602, and a lower fuel injection timing limit is shown by dashed plot 604. For the above, a vertical axis shows a relative fuel injection timing, with the relative fuel injection limit increasing up the vertical axis from bottom to top. The horizontal axis shows the engine notches increasing along the horizontal axis from left to right. The minimum fuel injection timing may increase (e.g., be more advanced) with notches, so that the minimum fuel injection timing is higher at high notches and lower at low notches. For example, fewer physical engine limitations are present at lower notches, while more physical engine limitations are present at higher notches (e.g., such as turbocharger speed, peak cylinder pressure, and fuel injection duration).

Figure 7A:
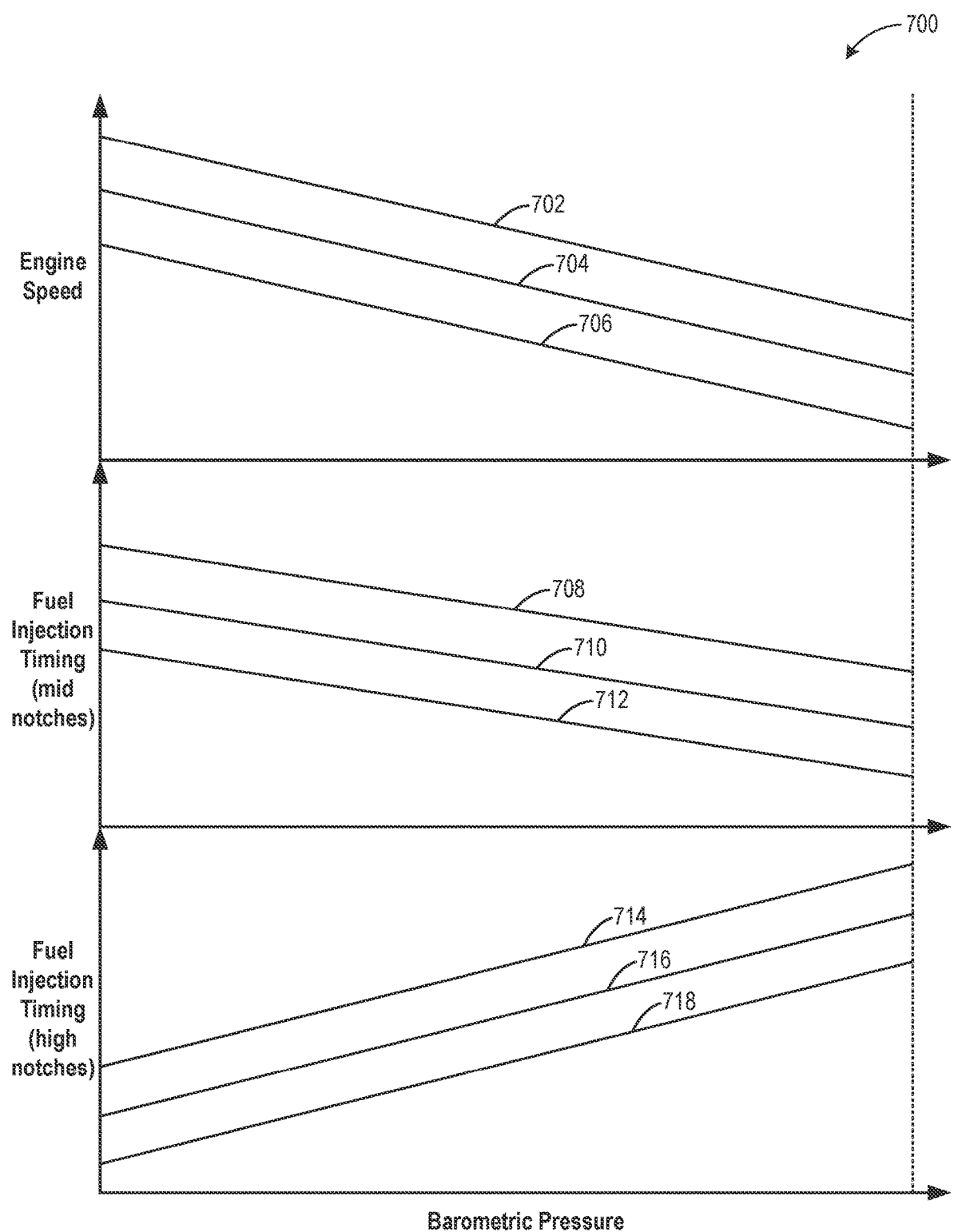
FIG. 7A shows example graphs of a relationship between barometric pressure, engine speed, and fuel injection timing for an engine.

FIG. 7A shows an example graph 700 of a relationship between barometric pressure and engine operating conditions, including engine speed and fuel injection timing. An engine speed at notch 5 is shown by plot 702, an engine speed at notch 3 is shown by plot 704, and an engine speed at notch 1 is shown by plot 706. Further, a fuel injection timing at notch 3 is shown by plot 712, a fuel injection timing at notch 4 is shown by plot 710, a fuel injection timing at notch 5 is shown by plot 708, a fuel injection timing at notch 6 is shown by plot 718, a fuel injection timing at notch 7 is shown by plot 716, and a fuel injection timing at notch 8 is shown by plot 714. For all of the above, the horizontal axis shows barometric pressure increasing along the horizontal axis from left to right. The vertical axis represents each labeled parameter. For each of plots 702, 704, 706, 708, 710, 712, 714, 716, and 718, a magnitude of the parameter increases up the vertical axis. In particular, for each of plots 708, 710, 712, 714, 716, and 718, the fuel injection timing is more advanced up the vertical axis. For example, the vehicle may operate in a variety of atmospheric conditions, so that a barometric pressure varies. Changes in barometric pressure may affect engine operating conditions, and in particular may effect intake air qualities such as impacting the airflow to the engine due to a change in the pressure/density. Higher barometric pressure may increase the density, which may lead to a higher mass flow to the engine. As such, engine parameters such as engine speed and fuel injection timing may be adjusted based on barometric pressure.

As shown in FIG. 7A, each of engine speed at notch 5 (plot 702), engine speed at notch 3 (plot 704), and engine speed at notch 1 (plot 706) decrease as barometric pressure increases. For example, engine speed at each of notch 5, notch 3, and notch 1 is higher at low barometric pressures, which may increase an oxygen to fuel ratio in engine cylinders and promote mixing. Note that the trend shown by plots 702, 704, and 706 may be similar for notch 2 and notch 4, not shown. This may counteract soot formation caused by reduced oxygen content in intake air at low barometric pressures. Further, as shown in FIG. 7A, each of the fuel injection timing at notch 3, the fuel injection timing at notch 4, and the fuel injection timing at notch 5 may be less advanced as barometric pressure increases, and may be more advanced as barometric pressure decreases. For example, mid-range engine notch settings, such as notch 3, notch 4, and notch 5, may be less advanced as barometric pressure increases. For example, the fuel injection timing for notch 3, notch 4, and notch 5 may be more advanced at lower barometric pressures, which may improve opacity and decrease PM emissions in the exhaust gas. Further, as shown in FIG. 7A, fuel injection timing for notch 6, notch 7, and notch 8 (e.g., high engine notch settings) may be more advanced as barometric pressure increases, and may be less advanced as barometric pressure decreases. For example, less advanced fuel injection timing at low barometric pressures may reduce NOx emissions.

Figure 7B:
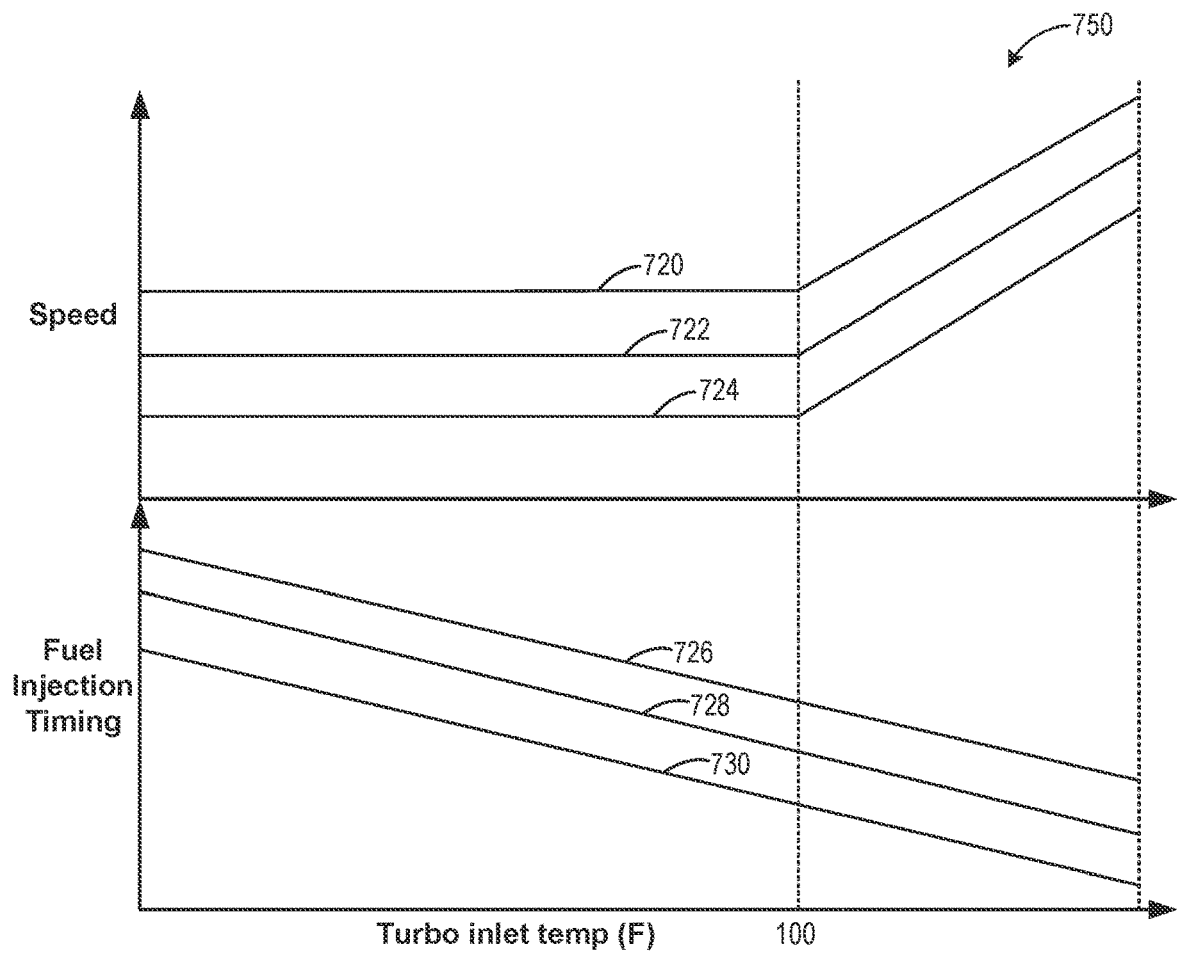
FIG. 7B shows example graphs of a relationship between turbocharger inlet temperature, speed, and fuel injection timing for an engine.

FIG. 7B shows an example graph 750 of a relationship between turbocharger inlet temperature (i.e., the compressor inlet temperature correlated to the ambient temperature) and engine operating conditions, including speed and fuel injection timing. An engine speed at notch 5 is shown by plot 720, an engine speed at notch 3 is shown by plot 722, and an engine speed at notch 1 is shown by plot 724. Note that the engine speed trends may be similar for notch 4 and notch 2, not shown. Further, a fuel injection timing at notch 6 is shown by plot 726, a fuel injection timing at notch 5 is shown by plot 728, and a fuel injection timing at notch 4 is shown by plot 730. For all of the above, the horizontal axis shows turbocharger inlet temperature increasing along the horizontal axis from left to right. The vertical axis represents each labeled parameter. For each of plots 720, 722, 724, 726, 728, and 730, a magnitude of the parameter increases up the vertical axis. For example, a turbocharger inlet temperature may influence engine operating conditions as well, such as by changing air temperature in the engine. As shown, at turbo inlet temperatures below 100° F., engine speed may be constant at each notch shown. In particular, the speed at notch 1 (plot 724) is constant below 100° F., the speed at notch 3 (plot 722) is constant below 100° F., and the speed at notch 5 (plot 720) is constant below 100° F. After the turbo inlet temperature exceeds 100, each of the speed at notch 1 (plot 724), the speed at notch 3 (plot 722), and the speed at notch 5 (plot 720) may increase. Further, the relationship between fuel injection timing and turbo inlet temperature is shown. As shown, as the turbo inlet temperature increases, the fuel injection timing may be adjusted to less advanced timings. For example, the relationship between fuel injection timing and turbo inlet temperature may be roughly inversely proportional.

Figure 7C:
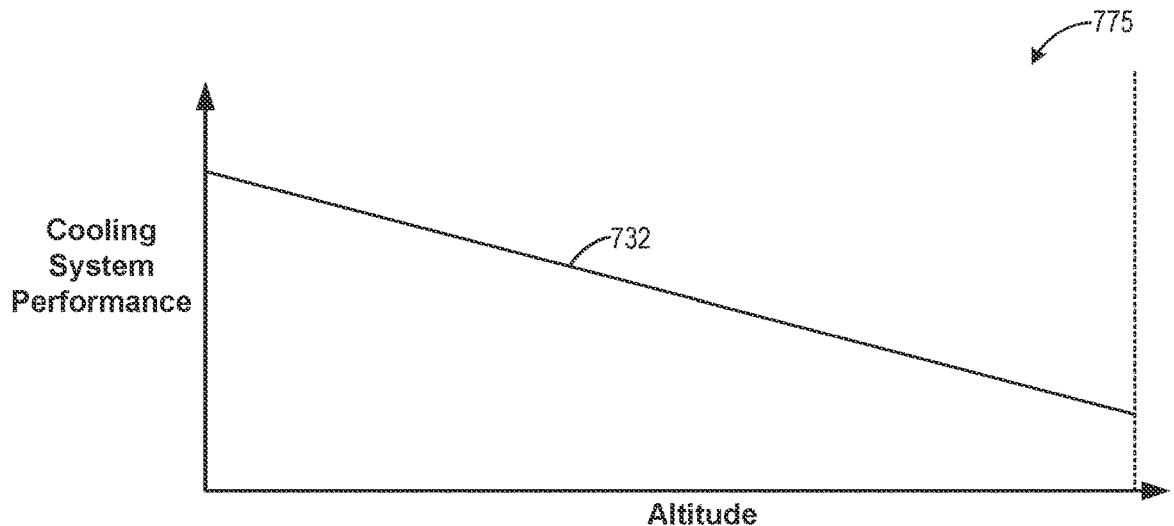
FIG. 7C shows an example graph of a relationship between engine altitude and performance of a cooling system of an engine.

Next, FIG. 7C shows a graph 775 of an example relationship between engine altitude and performance of a cooling system of the engine (e.g., cooling system performance). A cooling system performance is shown by plot 732. For example, the cooling system performance may represent a net effect of the cooling system. The cooling system performance may be adjusted via adjusting a temperature of cooling fluid, a pressure of the cooling fluid, a radiator speed, and the like. For the above, the horizontal axis shows altitude increasing along the horizontal axis from left to right. The vertical axis represents the labeled parameter. For plot 732, a magnitude of the parameter increases up the vertical axis. For example, altitude may also affect engine operating conditions. In particular, performance of a cooling system of the engine (e.g., cooling system performance) may be influenced by altitude, or by ambient barometric pressure and ambient temperature. As shown, the cooling system performance 732 decreases in proportion to altitude. Lower barometric pressure (higher altitude) may reduce cooling system performance because of the loss in air density used in convective cooling with the radiators. As altitude and ambient temperature increase, radiator fan speeds, and engine speeds may increase to try to maintain engine water temperature. Engine water may be used to cool engine oil and manifold air temperature. At high ambient conditions when the fans and engine may be at maximum speed, the engine power may be reduced to meet the required oil temperatures.

Next, FIG. 8 provides a method 800 for operating an engine, such as the engine described with respect to FIG. 1. For example, the engine system may include a common rail fuel system, an advanced intake valve closing (IVC) timing, and a turbocharger with a large map width (e.g., turbocharger with improved compressor map width). In particular, these elements may be advantageously combined in order to increase fuel efficiency for the engine. Method 800 will be described with respect to the locomotive vehicle 106 shown in FIG. 1, and with the calibration shown in FIGS. 2-7C, although method 800 may be applied in other systems. Instructions for carrying out method 800 and the rest of the methods included herein may be executed by a controller based on instructions stored on a memory of the controller and in conjunction with signals received from sensors of the vehicle system, such as the sensors described with reference to FIG. 1. The controller may employ actuators of the vehicle system to adjust engine operation according to the methods described below.

At 802, method 800 includes boosting intake air via a boosting mechanism (e.g., a turbocharger), the turbocharger having a map width to reduce vehicle emissions and increase vehicle efficiency. For example, air may be inducted into the engine system via an intake manifold. However, in order to increase pressure, the air may be boosted via the turbocharger. For example, a compressor portion of the turbocharger may provide compressed air.

At 804, method 800 includes inducting air into cylinders of the engine. For example, the intake air, after being boosted by the turbocharger at 802, may be inducted into cylinders of the engine. For example, each cylinder of the engine may include at least one intake valve. An actuator may adjust a position of the intake valves so that air may flow into the cylinders. For example, the intake valve opening time may be adjusted based on engine operating conditions.

At 806, method 800 includes adjusting an effective compression ratio of the cylinders via adjusting an intake valve closing (IVC) time. For example, by advancing the IVC time, the effective compression ratio of the cylinders may be decreased. Thus, the volumetric efficiency of the engine may be controlled.

At 808, method 800 includes injecting fuel into cylinders of the engine via a common rail fuel system. For example, the common rail fuel system may inject fuel into each cylinder at the same pressure, and may be controlled independently of engine speed, so that the fuel injection timing may be adjusted without adjusting engine RPM. For example, the fuel injection time may be advanced or retarded based on engine notch and other engine operating conditions. For example, the controller may adjust a signal to one or more fuel injectors in order to adjust the fuel injection time.

At 810, method 800 includes combusting the air-fuel mixture in the cylinders. For example, air and fuel in each of the cylinders may combust in order to generate power. Further, the combustion may create hot exhaust gas, which may be flowed out of the cylinders via exhaust valves.

At 812, method 800 includes energy extraction from the combustion exhaust gas in order to power the boosting mechanism (nozzle ring). For example, the turbocharger includes a nozzle ring on a turbine of the turbocharger. The nozzle ring directs the exhaust gas to convert exhaust gases into kinetic energy; thereby energy is extracted by the turbine. In particular, energy extracted from the exhaust gas by the turbine may be used to power a compressor of the turbocharger. For example, energy extracted by the turbine may drive rotation of a compressor shaft of the turbocharger. Thus, the hot exhaust gas produced via combustion may in turn be used to boost intake air to the cylinders. As another example, the nozzle ring (on the turbine of the turbocharger) may direct the exhaust flow into the turbine wheel; the turbine extracts the energy; and the nozzle ring may control the exhaust velocity into the turbine and inlet pressure as well.

At 814, method 800 optionally includes adjusting at least one of a fuel injection timing, a rail pressure, and an intake valve closing time. For example, based on engine operating conditions including engine notch, engine RPM, turbo inlet temperature, barometric pressure, and other conditions, one or more of the fuel injection timing, the rail pressure, and the IVC time may be adjusted in order to increase engine efficiency and decrease fuel consumption. In particular, in order to reduce emissions and increase efficiency, at least one of the fuel injection timing, the rail pressure, and the IVC time may be adjusted according to the calibrations shown in FIGS. 2-7B.

In this way, an engine system may provide power to a vehicle, while increasing efficiency, decreasing fuel consumption, and decreasing vehicle emissions. Overall, customer satisfaction may be increased. For example, by advantageously combining a boosting mechanism with increased map with, advance IVC, and a common rail fuel system, engine performance may be increased while fuel usage and vehicle emissions are decreased.

In addition to the calibrations for each engine notch, elaborated in FIGS. 2-7C, the engine may include calibrations for transient operation, such as when the engine transitions between engine output demands. For example, when the engine transitions between engine notches, the engine may enter a transient condition until the transition is complete. In particular, when the transition is upward in throttle call (e.g., the transition is from a lower engine notch to a higher engine notch), the transient condition may include calibrations for increasing engine load response.

Therefore, FIG. 9 provides a method 900 for operating an engine to transition from a first engine output demand to a second engine output demand. In an exemplary embodiment, the method may operate an engine to transition between notch settings or throttle settings. For example, when transitioning between the first engine notch and a second engine notch, the second engine notch higher than the first engine notch, the engine may enter a transient condition. Thus, when the engine transitions upwards in throttle call, the engine enters the transient condition, which includes a transient calibration for engine operating conditions such as fuel injection timing, rail pressure, and an engine speed reference. For example, the engine speed reference is a target engine speed. In particular, in order to increase a load response of the engine, the rail pressure may be increased, the fuel injection timing may be advanced, and the engine speed reference may be increased relative to steady state operation (e.g., steady state operation in each of the first engine notch and the second engine notch). Method 900 may be described with respect to the locomotive vehicle 106 shown in FIG. 1, although method 900 may be applied in other systems. Instructions for carrying out method 900 may be executed by a controller based on instructions stored on a memory of the controller and in conjunction with signals received from sensors of the vehicle system, such as the sensors described with reference to FIG. 1. The controller may employ actuators of the vehicle system to adjust engine operation according to the methods described below.

At 902, method 900 includes estimating and/or measuring operating conditions. The operating conditions may include, for example, vehicle speed, engine speed, engine load, engine notch, engine temperature, turbo inlet temperature, barometric pressure, and the like. For example, the controller may determine the engine notch based on a position of a throttle. As another example, the turbo inlet temperature may be measured by a temperature sensor positioned near the turbocharger inlet. As another example, the barometric pressure may be determined based on a pressure sensor exterior to the engine. As yet another example, the engine speed may be determined based on a crankshaft position sensor.

At 904, method 900 includes determining whether a notch change is requested. For example, the controller may determine whether a user has adjusted the engine notch, such as by adjusting a position of the throttle. For example, the controller may monitor the position of the throttle via a throttle position sensor. In particular, the controller may determine an engine notch based on the position of the throttle.

If method 900 determines at 904 that a notch change is not requested, method 900 continues to 908, as will be elaborated below. For example, if the controller determines that the throttle position has not been adjusted to a different engine notch, method 900 continues to 908.

If method 900 determines at 904 that a notch change is requested, method 900 continues to 906 and includes adjusting engine settings for transient operation. For example, if the controller determines that the notch change is a transition from the first engine notch to a second engine notch, and the second notch is a higher notch relative to the first notch, rail pressure may be increased, fuel injection timing may be advanced, and the engine speed reference may be increased. Stated differently, when the notch change is requested, and the notch change is to a higher notch (e.g., the engine is transitioning upward in throttle call), method 904 includes adjusting engine settings for transient operation by increasing the engine load response. To increase the engine load response, rail pressure is increased relative to the rail pressure at each of the first notch and the second notch, the fuel injection timing is increased relative to each of the first notch and the second notch, the fuel injection duration is increased relative to the first notch, and the engine speed reference is increased relative to each of the first notch and the second notch. If the second engine notch is lower relative to the first engine notch, the transient calibration may not include increasing the rail pressure, advancing fuel injection timing, and increasing the engine speed reference. For example, the transient calibration may include not adjusting the engine settings to increase the engine load response.

At 908, method 900 includes determining calibrations for a desired notch setting. For example, the calibrations for the desired notch setting may be determined based on a set of calibration tables, such as shown in FIGS. 2-7C. For example, based on the engine notch, a target rail pressure, a target fuel injection timing, a target engine RPM, a rail pressure limit, and a fuel injection timing limit may be selected. Further, based on ambient conditions (e.g., such as barometric pressure), the engine settings may be further adjusted.

At 910, method 900 includes adjusting engine operation to the desired settings for the desired notch. For example, the controller may adjust actuators of the engine in order to adjust one or more of a rail pressure, a fuel injection timing, an engine RPM, and the like. For example, at 910, the engine operates at the desired notch. Method 900 may then end.

Next, in FIG. 10, a prophetic example timeline 1000 for operating an engine is shown. For example, as elaborated with respect to method 900 of FIG. 9, when the engine transitions between engine output demands, the engine enters a transient condition, e.g., between notches. Further, because the second engine notch is higher than the first engine notch, the transient condition includes increasing an engine speed reference, increasing a fuel rail pressure, and advancing fuel injection timing in order to increase the load response of the engine. An engine notch setting is shown by plot 1002, a rail pressure for the fuel injection system is shown by plot 1004, a fuel injection timing is shown by plot 1006, and an engine speed reference is shown by plot 1008. For all of the above, the horizontal axis represents time, with time increasing along the horizontal axis from left to right. The vertical axis represents each labeled parameter. For each of plots 1004, 1006, and 1008, the magnitude of the parameter increases up the vertical axis. For plot 1002, the vertical axis shows whether the engine is operating at notch 4, ("4"), notch 5 ("5"), or in a transient state between notch 4 and notch 5 ("t").

Between time t0 and time t1, the engine is set to notch 4 (plot 1002). Accordingly, each of the rail pressure (plot 1004), the fuel injection timing (plot 1006), and the engine speed reference (plot 1008) may be set based on predetermined calibration tables for notch 4. For example, as shown, each of the rail pressure, the fuel injection timing, and the engine speed reference is relatively low at notch 4.

At time t1, the notch setting enters a transient condition. In particular, the transient condition occurs when the engine transitions between two engine notches. Further, the engine may be transitioning to a higher notch, so that the engine is transitioning upward in throttle call. In order to improve the load response of the engine, each of the rail pressure (plot 1004), the fuel injection timing (plot 1006), and the engine speed reference (plot 1008) are adjusted. As shown, the rail pressure (plot 1004) is increased relative to the rail pressure before time t1, the fuel injection timing (plot 1006) is increased relative to the rail pressure before time t1, and the engine speed reference (plot 1008) is increased relative to the engine speed reference before time t1. Between time t1 and time t2, while the engine is in a transient state between notches, each of the rail pressure, the fuel injection timing, and the engine speed reference remain constant.

At time t2, the engine leaves the transient state and transitions to operating at notch 5. For example, notch 5 is a higher power setting than notch 4, so that each of the rail pressure (plot 1004), the fuel injection timing (plot 1006), and the engine speed reference (plot 1008) is increased relative to operation at notch 4. However, each of the rail pressure (plot 1004), the fuel injection timing (plot 1006), and the engine speed reference (plot 1008) is lower at notch 5 relative to operating in the transient condition (e.g., between time t1 and time t2).

Between time t2 and time t3, the engine remains at notch 5, and each of the rail pressure (plot 1004), the fuel injection timing (plot 1006), and the engine speed reference (plot 1008) remains constant, at a level higher than operating at notch 4 (e.g., between time t0 and time t1), and lower than operating in the transient condition (e.g., between time t1 and time t2).

Thus, as shown by FIG. 10, when the engine transitions from a first notch setting (e.g., notch 4) to a second, higher notch setting (e.g., notch 5), the engine enters a transient condition, each of the rail pressure, fuel injection timing, and engine speed reference higher in the transient condition than in either of the first notch setting and the second, higher notch setting. Increasing the rail pressure, fuel injection timing, and engine speed reference may increase a load response of the engine, which may increase vehicle fuel efficiency In this way, a diesel locomotive engine system of a vehicle may be operated to decrease vehicle emissions while increasing fuel efficiency. In particular, the engine may be operated with a turbocharger with an increased map width, a common rail fuel system, and advanced intake valve closing to reduce airflow to the cylinders of the engine. These three features may be combined synergistically to reduce vehicle emissions, such as NOx and PM, while increasing fuel efficiency across the operating range of the engine. For example, in an engine system with these features, the engine RPM, rail pressure, fuel injection timing, rail pressure limit, fuel injection timing limit, and other engine parameters may be calibrated for each engine notch. The engine parameters may be further calibrated based on ambient conditions, such as barometric pressure, turbo inlet temperature, and altitude. Overall, vehicle emissions may be decreased while fuel efficiency may be increased. As an example, decreased vehicle emissions and increased fuel efficiency may allow the diesel locomotive system to meet environmental regulations without operating the engine outside of mechanical limits of the engine. As such, an incidence of component degradation may be increased. Further, by increasing vehicle fuel efficiency, a cost of operating the vehicle may be reduced. For example, when the vehicle operates with increased fuel efficiency, less fuel is required for travelling the same distance, so that total fuel costs decrease overall.

The technical effect of including a common rail fuel system, a turbocharger, and advanced IVC in an engine system of a locomotive system is that volumetric efficiency of the cylinders is decreased, while emissions are decreased and fuel efficiency is increased.

The disclosure also provides support for a method, comprising: adjusting an amount of advance of a fuel injection timing of a plurality of fuel injectors of a diesel internal combustion engine relative to top dead center (TDC) responsive to engine notch, where, as the engine notch increases, the amount of advance first decreases and then increases. In a first example of the method, the method further comprises: adjusting an upper limit for increasing the amount of advance the fuel injection timing of the plurality of fuel injectors relative to TDC responsive to the engine notch, where, as the engine notch increases, the upper limit for increasing the amount of advance of the plurality of fuel injectors relative to TDC decreases, and adjusting a lower limit for decreasing the amount of advance of the fuel injection timing of the plurality of fuel injectors relative to TDC responsive to the engine notch, where, as the engine notch increases, the lower limit for decreasing the amount of advance of the fuel injection timing of the plurality of fuel injectors relative to TDC increases. In a second example of the method, optionally including the first example, the method further comprises: adjusting a number of engine revolutions per minute (RPM) responsive to the engine notch, where, as the engine notch increases, the number of engine RPM increases. In a third example of the method, optionally including one or both of the first and second examples, the method further comprises: adjusting a rail pressure of a common rail fuel injection system of the diesel internal combustion engine responsive to the engine notch, where, as the engine notch increases, the rail pressure of the common rail fuel injection system increases. In a fourth example of the method, optionally including one or more or each of the first through third examples, the method further comprises: responsive to transitioning from a first engine notch to a second engine notch, the second engine notch higher than the first engine notch, increasing both of a rail pressure of a common rail fuel injection system and an engine speed reference. In a fifth example of the method, optionally including one or more or each of the first through fourth examples, the method further comprises: responsive to a turbocharger inlet temperature of a turbocharger of the diesel internal combustion engine above 100° F., increasing an engine speed, and decreasing the amount of advance of the fuel injection timing of the plurality of fuel injectors relative to TDC as the turbocharger inlet temperature increases. In a sixth example of the method, optionally including one or more or each of the first through fifth examples, the engine notch is determined based on a state of a user input for selecting a desired engine notch for an engine governor of the diesel internal combustion engine.

The disclosure also provides support for an engine system, comprising: a plurality of cylinders, an engine governor with a plurality of engine notch settings, a common rail fuel injection system, the common rail fuel injection system including a plurality of fuel injectors coupled to the plurality of cylinders, a turbocharger including a nozzle ring on a turbine of the turbocharger, a camshaft configured for an advanced intake valve closing time, a controller including executable instructions stored in non-transitory memory that, when executed, cause the controller to: responsive to an engine notch setting increasing from a first level to a second level higher than the first level, decrease an amount of advance of a fuel injection timing of the plurality of fuel injectors relative to top dead center (TDC), and responsive to the engine notch setting further increasing from the second level to a third level higher than the second level, increase the amount of advance of the fuel injection timing of the plurality of fuel injectors relative to TDC. In a first example of the system, the controller includes further executable instructions stored in the non-transitory memory that, when executed, cause the controller to: decrease an upper limit for increasing the amount of advance of the fuel injection timing of the plurality of fuel injectors relative to TDC as the engine notch setting increases from the first level to the second level, and increase a lower limit for decreasing the amount of advance of the fuel injection timing of the plurality of fuel injectors relative to TDC as the engine notch setting increases from the first level to the second level. In a second example of the system, optionally including the first example, the controller includes further executable instructions stored in the non-transitory memory that, when executed, cause the controller to: responsive to the engine notch setting increasing from the first level to the second level, increase a number of engine revolutions per minute (RPM). In a third example of the system, optionally including one or both of the first and second examples, the controller includes further executable instructions stored in the non-transitory memory that, when executed, cause the controller to: responsive to the engine notch setting increasing from the first level to the second level, increase a rail pressure of the common rail fuel injection system. In a fourth example of the system, optionally including one or more or each of the first through third examples, the controller includes further executable instructions stored in the non-transitory memory that, when executed, cause the controller to: responsive to an engine RPM at or below 580 RPM, limit the rail pressure of the common rail fuel injection system to be at or below 1000 bar, and responsive to the engine RPM above 580 RPM, limit the rail pressure of the common rail fuel injection system to be at or below 1600 bar. In a fifth example of the system, optionally including one or more or each of the first through fourth examples, the controller includes further executable instructions stored in the non-transitory memory that, when executed, cause the controller to: responsive to a transient condition during while transitioning from the first engine notch setting to the second engine notch setting, the second engine notch setting higher than the first engine notch setting, increase both of a rail pressure of the common rail fuel injection system and an engine speed reference. In a sixth example of the system, optionally including one or more or each of the first through fifth examples, the controller includes further instructions stored in the non-transitory memory that, when executed, cause the controller to: responsive to barometric pressure increasing, decrease an engine speed of the engine system, responsive to the barometric pressure increasing and the engine notch setting at a mid-range engine notch setting, decrease the amount of advance of the fuel injection timing relative to TDC, and responsive to the barometric pressure increasing and the engine notch setting at a high engine notch setting, advance the fuel injection timing relative to TDC. In a seventh example of the system, optionally including one or more or each of the first through sixth examples, the controller includes further instructions stored in the non-transitory memory that, when executed, cause the controller to: responsive to a turbocharger inlet temperature above 100° F., increase an engine speed, and decrease the amount of advance of the fuel injection timing relative to TDC as the turbocharger inlet temperature increases.

The disclosure also provides support for a system, comprising: a diesel engine including a plurality of cylinders, an engine governor with a plurality of engine notch settings, a common rail fuel injection system, the common rail fuel injection system including a plurality of fuel injectors coupled to the plurality of cylinders, a turbocharger including a nozzle ring, a camshaft configured for an advanced intake valve closing time, a controller including executable instructions stored in non-transitory memory that, when executed, cause the controller to: responsive to an engine notch setting, adjust an amount of advance of a fuel injection timing of the plurality of fuel injectors relative to top dead center (TDC) based on a first non-monotonic relationship between the engine notch setting and the fuel injection timing. In a first example of the system, to adjust the amount of advance of the fuel injection timing of the plurality of fuel injectors relative to TDC based on a non-monotonic relationship between the engine notch setting and the fuel injection timing, the controller includes further instructions stored in the non-transitory memory that, when executed, cause the controller to: responsive to the engine notch setting increasing from a first level to a second level higher than the first level, decrease the amount of advance of the fuel injection timing of the plurality of fuel injectors relative to TDC, and responsive to the engine notch setting further increasing from the second level to a third level higher than the second level, increase the amount of advance of the fuel injection timing of the plurality of fuel injectors relative to TDC. In a second example of the system, optionally including the first example, the controller includes further instructions stored in non-transitory memory that, when executed, cause the controller to: decrease an upper limit for increasing the amount of advance of the fuel injection timing of the plurality of fuel injectors relative to TDC as the engine notch setting increases, and increase a lower limit for decreasing the amount of advance of the fuel injection timing of the fuel injectors relative to TDC as the engine notch setting decreases. In a third example of the system, optionally including one or both of the first and second examples, the controller includes further instructions stored in non-transitory memory that, when executed, cause the controller to: responsive to the engine notch setting, adjust a number of engine revolutions per minute (RPM) based on a monotonic relationship between the engine notch setting and the number of engine RPM. In a fourth example of the system, optionally including one or more or each of the first through third examples, the controller includes further instructions stored in non-transitory memory that, when executed, cause the controller to: responsive to barometric pressure, adjust the amount of advance of the fuel injection timing of the plurality of fuel injectors relative to TDC based on a second non-monotonic relationship between the engine notch setting and the fuel injection timing.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
adjusting a fuel injection timing of a plurality of fuel injectors of an internal combustion engine relative to top dead center (TDC) responsive to engine output demand proportional to an engine notch, where, as the engine output demand increases, an amount of retard increases during a first notch range and then an amount of advance increases during a second notch range greater than the first.

2. The method of claim 1, further comprising:
adjusting an upper limit for increasing the amount of advance the fuel injection timing of the plurality of fuel injectors relative to TDC responsive to the engine output demand, where, as the engine output demand increases, the upper limit for increasing the amount of advance of the plurality of fuel injectors relative to TDC decreases; and
adjusting a lower limit for decreasing the amount of advance of the fuel injection timing of the plurality of fuel injectors relative to TDC responsive to the engine output demand, where, as the engine output demand increases, the lower limit for decreasing the amount of advance of the fuel injection timing of the plurality of fuel injectors relative to TDC increases.

3. The method of claim 1, further comprising:
adjusting a number of engine revolutions per minute (RPM) responsive to the engine output demand, where, as the engine output demand increases, the number of engine RPM increases, wherein the engine combusts diesel fuel.

4. The method of claim 1, further comprising:
adjusting a rail pressure of a common rail fuel injection system of the internal combustion engine responsive to the engine output demand, where, as the engine output demand increases, the rail pressure of the common rail fuel injection system increases.

5. The method of claim 1, further comprising:
responsive to transitioning from a first engine output demand to a second engine output demand, the second engine output demand higher than the first engine output demand, increasing both of a rail pressure of a common rail fuel injection system and an engine speed reference.

6. The method of claim 1, further comprising:
responsive to a turbocharger inlet temperature of a turbocharger of the internal combustion engine above 100° F., increasing an engine speed; and
decreasing the amount of advance of the fuel injection timing of the plurality of fuel injectors relative to TDC as the turbocharger inlet temperature increases.

7. The method of claim 1, wherein the engine output demand is determined based on a state of a user input for selecting a desired engine output demand for an engine governor of the internal combustion engine.

8. An engine system, comprising:
a plurality of cylinders;
an engine governor with a plurality of engine output demands;
a common rail fuel injection system, the common rail fuel injection system including a plurality of fuel injectors coupled to the plurality of cylinders;
a turbocharger including a nozzle ring on a turbine of the turbocharger;
a camshaft configured for an advanced intake valve closing time;
a controller including executable instructions stored in non-transitory memory that, when executed, cause the controller to:
responsive to an engine output demand increasing from a first level to a second level higher than the first level through a first engine notch range, increase an amount of retard of a fuel injection timing of the plurality of fuel injectors relative to top dead center (TDC); and
responsive to the engine output demand further increasing from the second level to a third level higher than the second level through a second engine notch range comprising higher engine notches than the first engine notch range, increase an amount of advance of the fuel injection timing of the plurality of fuel injectors relative to TDC.

9. The engine system of claim 8, wherein the controller includes further executable instructions stored in the non-transitory memory that, when executed, cause the controller to:
decrease an upper limit for increasing the amount of advance of the fuel injection timing of the plurality of fuel injectors relative to TDC as the engine output demand increases from the second level to the third level; and
increase a lower limit for decreasing the amount of advance of the fuel injection timing of the plurality of fuel injectors relative to TDC as the engine output demand increases from the second level to the third level.

10. The engine system of claim 8, wherein the controller includes further executable instructions stored in the non-transitory memory that, when executed, cause the controller to:
responsive to the engine output demand increasing from the first level to the second level, increase a number of engine revolutions per minute (RPM).

11. The engine system of claim 8, wherein the controller includes further executable instructions stored in the non-transitory memory that, when executed, cause the controller to:
responsive to the engine output demand increasing from the first level to the second level, increase a rail pressure of the common rail fuel injection system.

12. The engine system of claim 11, wherein the controller includes further executable instructions stored in the non-transitory memory that, when executed, cause the controller to:
responsive to an engine RPM at or below 580 RPM, limit the rail pressure of the common rail fuel injection system to be at or below 1000 bar; and
responsive to the engine RPM above 580 RPM, limit the rail pressure of the common rail fuel injection system to be at or below 1600 bar.

13. The engine system of claim 8, wherein the controller includes further executable instructions stored in the non-transitory memory that, when executed, cause the controller to:
responsive to a transient condition during while transitioning from a first engine output demand to a second engine output demand, the second engine output demand higher than the first engine output demand, increase both of a rail pressure of the common rail fuel injection system and an engine speed reference.

14. The engine system of claim 8, wherein the controller includes further instructions stored in the non-transitory memory that, when executed, cause the controller to:
responsive to barometric pressure increasing, decrease an engine speed of the engine system;
responsive to the barometric pressure increasing and the engine output demand at a mid-range engine output demand, decrease the amount of advance of the fuel injection timing relative to TDC; and
responsive to the barometric pressure increasing and the engine output demand at a high engine output demand, advance the fuel injection timing relative to TDC.

15. The engine system of claim 8, wherein the controller includes further instructions stored in the non-transitory memory that, when executed, cause the controller to:
responsive to a turbocharger inlet temperature above 100° F., increase an engine speed; and
decrease the amount of advance of the fuel injection timing relative to TDC as the turbocharger inlet temperature increases.

16. A system, comprising:
an engine including a plurality of cylinders;
an engine governor with a plurality of engine output demand;
a common rail fuel injection system, the common rail fuel injection system including a plurality of fuel injectors coupled to the plurality of cylinders;
a turbocharger including a nozzle ring;
a camshaft configured for an advanced intake valve closing time;
a controller including executable instructions stored in non-transitory memory that, when executed, cause the controller to:
responsive to an engine output demand proportional to an engine notch, adjust a fuel injection timing of the plurality of fuel injectors relative to top dead center (TDC) based on a first non-monotonic relationship between the engine output demand and the fuel injection timing, wherein the fuel injection timing is retarded as the engine output demand increases through a first engine notch range, and wherein the fuel injection timing is advanced as the engine output demand increases through a second engine notch range including engine notches higher than the first engine notch range.

17. The system of claim 16, wherein to adjust the fuel injection timing of the plurality of fuel injectors relative to TDC based on a non-monotonic relationship between the engine output demand and the fuel injection timing, the controller includes further instructions stored in the non-transitory memory that, when executed, cause the controller to:
responsive to the engine output demand increasing from a first level to a second level higher than the first level through the first engine notch range increasing an amount of retard of the fuel injection timing of the plurality of fuel injectors relative to TDC; and
responsive to the engine output demand further increasing from the second level to a third level higher than the second level through the second engine notch range, increase an amount of advance of the fuel injection timing of the plurality of fuel injectors relative to TDC, wherein a least advanced fuel injection timing of the second engine notch range is more advanced than a most advanced fuel injection timing of the first engine notch range.

18. The system of claim 16, wherein the controller includes further instructions stored in non-transitory memory that, when executed, cause the controller to:
decrease an upper limit for increasing the amount of advance of the fuel injection timing of the plurality of fuel injectors relative to TDC as the engine output demand increases; and
increase a lower limit for decreasing the amount of advance of the fuel injection timing of the fuel injectors relative to TDC as the engine output demand decreases.

19. The system of claim 16, wherein the controller includes further instructions stored in non-transitory memory that, when executed, cause the controller to:
responsive to the engine output demand, adjust a number of engine revolutions per minute (RPM) based on a monotonic relationship between the engine output demand and the number of engine RPM.

20. The system of claim 16, wherein the controller includes further instructions stored in non-transitory memory that, when executed, cause the controller to:
responsive to barometric pressure, adjust the amount of advance of the fuel injection timing of the plurality of fuel injectors relative to TDC based on a second non-monotonic relationship between the engine output demand and the fuel injection timing.

* * * * *